Jan. 31, 1967  D. R. FALKENBERG ETAL  3,301,402

AQUARIUM FILTER

Filed Feb. 26, 1964

INVENTORS.
Douglass R. Falkenberg
BY Edward L. Sharpe

Schramm, Kramer & Sturges

ATTORNEYS.

United States Patent Office 3,301,402
Patented Jan. 31, 1967

3,301,402
AQUARIUM FILTER
Douglass R. Falkenberg, 20997 Westlake Road, Rocky River, Ohio 44116, and Edward L. Sharpe, Elyria, Ohio; said Sharpe assignor to said Falkenberg
Filed Feb. 26, 1964, Ser. No. 347,554
4 Claims. (Cl. 210—169)

This invention relates to filters and more particularly to filters for an aqueous medium, especially those existing in aquariums where filtering is essential to the well being of aquatic animal life.

In the past, various filters for conditioning the aqueous medium contained in aquariums for the keeping of aquatic life such as fish, lobsters and other marine life have been provided. A problem arises in finding a suitable filter for aquariums containing smaller species of marine life, particularly small fry which are in danger of being drawn into the filter and destroyed. This invention solves that problem as smaller species of marine life cannot be drawn into this filter. This filter is, therefore, especially suitable for use in aqueous media where marine life is bred.

To the accomplishment of the foregoing and related ends, said invention, then, consists of the means hereinafter fully described and particularly pointed out in the appened claims, the following description and annexed drawings setting forth in detail certain illustrative embodiments of the invention, such disclosed means constituting, however, but a few of the various forms in which the principle of this invention may be employed.

Briefly stated this invention is in a submersible filter for conditioning an aqueous medium. The filter medium is a porous, physically solid cylindrical body having a hollow core such as may be formed by an axially extending bore and having its outer surface provided with a plurality of circumferentially disposed flutes parallel to the axis of said cylindrical body. The hollow core of the filter medium is sealed at one extremity by a suitable plug. In a preferred embodiment, the plug is in the form of a base and is provided with a cylindrical wall for upstanding rim portion which is attached to a solid disc. The rim portion is conveniently adapted to removably coact with the hollow core of said filter medium to seal that extremity of the bore. The hollow core of the filter medium is also sealed at its other extremity by a suitable plug having apertures therethrough as hereinafter more particularly described. In a preferred embodiment this plug is a cap having a cylindrical wall or depending rim portion attached to a solid disc portion and provided with an annular flange. The cylindrical wall or rim portion of the cap is adapted to removably coact with the hollow core of said filter medium to seal this extremity of the bore and to permit ready replacement of the filter medium from time to time. Inlet and outlet ports are located in the top disc portion and extend therethrough to communicate with the interior of said bore. An inlet tube adapted to coact with an air pump of any conventional structure extends through the inlet port of said cap into the hollow core of the filter medium to a point adjacent the most deeply submersed portion of the filter medium when in operating position within the aqueous medium being conditioned. A short outlet tube refereably of greater diameter than the inlet tube is provided and coacts with the outlet port of said cap, and extends into the aqueous medium in which the filter medium is submerged.

In operation, then, the aqueous medium which is to be conditioned is drawn through the filter medium into the hollow core by the action of the air rising from the most deeply submerged point within the core to the exit tube. The filtrate fluid is then forced through the outlet port or exit tube back into the aqueous medium, while the solid suspended matter is accumulated on the external surface of the filter medium and in the pores.

Figure 1:
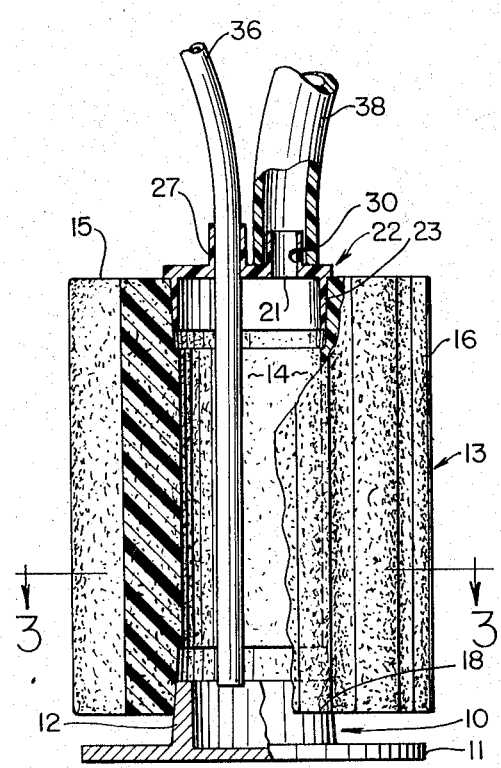
FIG. 1 is a side view and partial section showing the base, the filter medium, the cap, the inlet tube and outlet tube.
Figure 5:
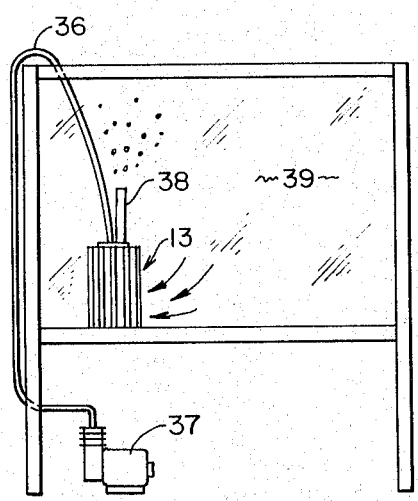
FIG. 5 shows an aquarium having the filter of this invention connected to an air pump.
Figure 2:
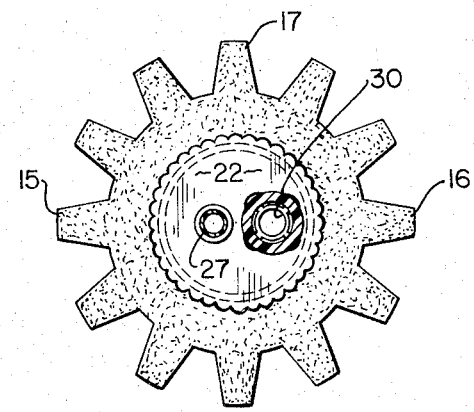
FIG. 2 is a top view of the filter.
Figure 3:
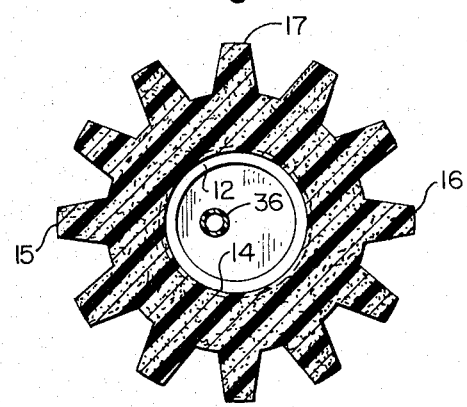
FIG. 3 is a cross section of the filter taken in the plane indicated by the line 3—3 of FIG. 1.
Figure 4:
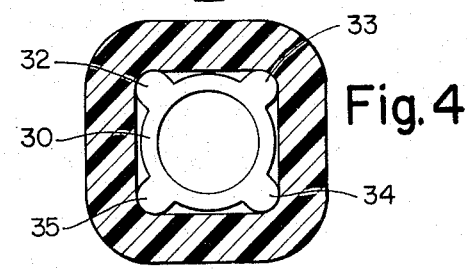
FIG. 4 is an enlarged cross sectional view of the outlet port, located in the cap of the filter.

Referring more particularly to FIGS. 1–5, there is provided a base 10 having a solid flange portion 11 integral with upstanding cylindrical wall portion 12. The filter medium 13 has a hollow core, formed by an axially extending bore. The outer surface of filter medium 13 is provided with a plurality of circumferentially disposed flutes, e.g., 15, 16 and 17, parallel to the axis of said filter medium 13. The upstanding rim or wall portion 12 of base 10 is adapted to be tightly fitted into bore 14 at one extremity 18 and to seal the opening. The other extremity 21 of bore 14 is sealed by means of a cap 22. Cap 22 is provided with a depending skirt 23 integral therewith, and adapted to fit tightly into this extremity of bore 14. Extending from cap 22 and integrally cast therewith, is a pair of nipples 27 and 30, communicating with bore 14. Nipple 27 is adapted, in the embodiment shown, to serve as a sleeve for guiding and retaining, by friction, an air inlet tube 36. Nipple 30 is desirably of larger internal diameter, and is conveniently, although not necessarily adapted to frictionally retain a tubular discharge or outlet extension 38. For such purpose, retaining beads 32, 33, 34, and 35, may be equally spaced around the outer circumference of nipple 30, as best shown in FIG. 4. Inlet tube 36 extends through nipple 27 down into bore 14 to a point adjacent base 10 which is more deeply submerged than the outlet 38. Air inlet tube 36 is connected to an air pump 37. The free extremity of tube 38 extends into the aqueous medium 39 as shown in FIG. 5.

Base 10 can be cast as a unit from any heavy material, preferably metallic material, e.g., lead or zinc. A cap 22 can be cast as a unit in an extrusion type plastic molding machine using polyethylene, or any other suitable non-toxic thermoplastic water insoluble resinous material.

This filter, as previously stated, is especially suited for use in aquariums wherein aquatic life is bred. This filter medium is solid, and because the velocity of fluid adjacent the filter medium is so low, entrapment of small fry, or baby fish is avoided. The aqueous medium to be filtered, is drawn into the filter medium over a large filtering area, and passes through the filter medium at a slower rate which does not draw the smaller species against or into the filter which would otherwise trap and destroy them.

The filter medium 13 may be of any foraminous physically solid material, such as, porous carbon, porous alumina, porous sintered metal, or porous accreted resin bonded fibrous material. Very satisfactory results have been secured with a relatively rigid, self-supporting, thick walled tubular element composed entirely of resin-impregnated fibrous material. Such devices are completely disclosed in Patent 2,539,768, and the method of forming such filter elements is fully disclosed in the Patent 2,539,-767.

As indicated and disclosed in these references, the filtering elements are intended for use in filtering liquids and particularly aqueous media that are caused to flow radially inwardly through the filtering elements under a differential pressure. The fibrous structure of the filtering element is of graded porosity, with the size of the pores progressively increasing radially outwardly toward the outer surface. By virtue of such graded porosity or density, as the fluid flows inwardly through progressively smaller and more numerous interstices, the foreign particles to be filtered out penetrate varying ducts according to their size. The graded porosity in the filter element is accomplished by accreting resin-impregnated fibers from a liquid dispersion of such fibers under controlled conditions as to the amount of vacuum used in effecting such accretion and as to the composition characteristics of the fibrous stock used. In making the filter element, wool fibers are the principal fibrous materials employed with up to 40% by weight of other fibers such as esparto, Yucca, asbestos and the like. The fibrous material is first beaten and added to a liquid dispersion of a resin such as melamine-formaldehyde, in a solvent, or any suitable liquid suspending medium. The resulting mixture is brought to proper consistency and then fed to felting tank where it is kept thoroughly agitated in order to maintain a uniform consistency throughout the entire mass.

In accordance with the disclosure of Patent 2,539,767, there is employed a perforated former or die which is immersed in the liquid suspension of fibers within the felting tank, and the resin-impregnated fibers are caused to be accreted upon the formers by the application of a controlled degree of suction imposed upon the interior of such formers. By controlling the degree of vacuum and the length of time over which it is applied, in conjunction with the proper control of the characteristics of the fibers, a filter medium is produced of the depth, or thickness, and graded porosity that is desired. The proportion of resin in the fibrous body is also a factor in producing a filter element of the desired degree of strength to withstand the pressure drive to which it may be subjected in use. A specific composition that has been found particularly suitable is one comprising 85% wool fibers and 15% esparto fibers, and having 35% resin content by weight of the finished filter element.

The filter elements may be used in the cylindrical form having a slightly tapered bore axially disposed therein, such bore being the result of forming the filter medium upon a tapered porous former or mandrel. It is preferred in the filtering of aquarium media that the filter be fluted, as is best shown in FIGS. 2 and 3, in order to increase the surface exposed to the aqueous medium to be filtered, and also to present a variety of porosities to the medium being filtered.

It has been found most unexpectedly, that the melamine-formaldehyde resin binder used in forming the resin bonded fibrous filter media as described in Patent 2,539,768 coacts especially with fresh water and saline media to reduce the quantity of nitrogen-containing contaminants. In aquarium media, excessive build up of nitrogen containing contaminants from the waste products of aquatic animal life, particularly in the case of lobsters, seriously limits the length of time that such animals can be kept alive. It has been found that the malamine-formaldehyde resin as deposited from a 50% solids solution in butyl alcohol is particularly effective as an adsorbent for nitrogenous matter.

In an ordinary 15-gallon fresh water fish tank, it has been found that with a normal stock of tropical fish, these filter media are effective to maintain the aquarium medium brilliantly clear and at a bacteria count which is less than the bacterial count in municipally treated drinking water for periods of time ranging upwards of two months. The replacement filter media are relatively inexpensive, and because of the simplified construction of the cartridge are readily replaced.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A submersible filter for conditioning an aqueous medium comprising in combination:
   (a) a porous physically solid cylindrical medium having its outer surface provided with a plurality of circumferentially disposed spaced flutes parallel to the axis of said medium, and having a hollow core formed by an axially extending bore, the pores of said meduim being the sole inlet of aqueous medium into said bore;
   (b) a cap for closing the bore at one end of said cylindrical medium at the least submersible extremity;
   (c) a weighted base closing the bore at the other end of the cylindrical medium at its deepest submersible extremity, said weighted base being heavier than said cap for maintaining said medium in an upright position with the axis of the bore vertically disposed;
   (d) conduit means extending through the cap for introducing air into said bore at a point adjacent said base means; and
   (e) separate means also extending through the cap for exiting air and conditioned aqueous medium from said bore adjacent the least submersible extremity thereof.

2. A submersible filter for conditioning an aqueous medium in accordance with claim 1 wherein said cap includes a depending skirt integral therewith and adapted to be removably inserted into and frictionally retained by the bore of said filter medium at one extremity, and said cap, having extending therefrom and integral therewith, a pair of nipples communicating with said bore of said filter, one of said nipples including air inlet means for introducing air adjacent the deepest submersed portion of said bore, and the other of said nipples adapted to exhaust air and filtrate from said bore.

3. A submersible filter for conditioning an aqueous medium in accordance with claim 1 wherein the weighted base means, acting as ballast for said filter medium, includes a solid metallic disc portion integral with a cylindrical wall portion, and adapted to be frictionally retained by the bore of said filter medium at its other extremity.

4. A submersible filter for conditioning an aqueous medium comprising in combination:
   (a) a porous physically solid cylindrical filter medium having its outer surface provided with a plurality of circumferentially disposed spaced flutes parallel to the axis of said medium, and having a hollow core formed by an axially extending bore, the pores of said medium being the sole inlet of aqueous medium into said bore;
   (b) a cap for closing said bore at one end of said cylindrical medium at the least submersible extremity, said cap having a depending skirt integral therewith and adapted to be removably inserted into the bore of said filter medium at one extremity, but said cap having located thereon, and extending therethrough a pair of integrally cast nipples,
   (c) a weighted base heavier than said cap acting as ballast for said filter medium, and having a cylindrical wall portion integral with a solid disc portion and adapted to be removably inserted into the bore of said filter medium for closing the bore at the other end of the cylindrical medium at its deepest submersible extremity;
   (d) an inlet tube for introducing air into said bore, said tube extending through, and frictionally held in, one of said pair of nipples in said cap, into said hollow bore to a point adjacent said base, and (e) an outlet tube of preferably larger diameter for exiting air and water from said bore, said tube extending from the other one of said pair of nipples in said cap into the aqueous medium outside said filter medium.

References Cited by the Examiner

UNITED STATES PATENTS

| | | | |
|---|---|---|---|
| 771,971 | 10/1904 | Davidson | 210—496 |
| 1,722,626 | 7/1929 | Dean. | |
| 2,676,921 | 4/1954 | Vansteenkiste | 210—169 |
| 2,786,026 | 3/1957 | Stark | 210—169 |
| 3,160,588 | 12/1964 | Alarie | 210—463 |

FOREIGN PATENTS

| | | |
|---|---|---|
| 817,976 | 10/1951 | Germany. |
| 870,975 | 6/1961 | Great Britain. |

REUBEN FRIEDMAN, *Primary Examiner.*

FRANK W. MEDLEY, *Assistant Examiner.*